United States Patent
Barth et al.

(10) Patent No.: US 12,001,533 B2
(45) Date of Patent: Jun. 4, 2024

(54) METHOD AND SYSTEM FOR AUTHENTICATING AN OCCUPANT WITHIN AN INTERIOR OF A VEHICLE

(71) Applicant: Aptiv Technologies AG, Schaffhausen (CH)

(72) Inventors: Alexander Barth, Wermelskirchen (DE); Douglas L. Welk, Rossville, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 460 days.

(21) Appl. No.: 17/392,083

(22) Filed: Aug. 2, 2021

(65) Prior Publication Data

US 2022/0067135 A1 Mar. 3, 2022

(30) Foreign Application Priority Data

Sep. 1, 2020 (EP) ..................................... 20193897

(51) Int. Cl.
*G06F 21/00* (2013.01)
*G06F 18/2413* (2023.01)
(Continued)

(52) U.S. Cl.
CPC .......... *G06F 21/32* (2013.01); *G06F 18/2413* (2023.01); *G06V 10/60* (2022.01);
(Continued)

(58) Field of Classification Search
CPC .... G06F 21/32; G06F 18/2413; G06F 18/214; G06V 10/60; G06V 20/59; G06V 40/103;
(Continued)

(56) References Cited

U.S. PATENT DOCUMENTS

| 8,515,124 B2 | 8/2013 | Yoo et al. |
| 9,025,830 B2 | 5/2015 | Ma et al. |

(Continued)

FOREIGN PATENT DOCUMENTS

| CN | 110807368 | 2/2020 |
| CN | 106599772 | 4/2020 |

OTHER PUBLICATIONS

"Extended European Search Report", EP Application No. 20193897. 4, Feb. 25, 2021, 13 pages.
(Continued)

*Primary Examiner* — Jeffrey C Pwu
*Assistant Examiner* — William A Corum, Jr.

(57) ABSTRACT

A method is provided for authenticating an occupant within an interior of a vehicle. The vehicle includes a camera which is configured to monitor the interior of the vehicle, and a processing device being configured to process image or video data provided by the camera. Characteristic features are determined being visible via the camera, and authenticating image or video data are captured via the camera while an occupant is present within the interior of the vehicle. Via the processing device, face recognition and liveliness check are performed for the occupant based on the authenticating image or video data, and an identification degree of the characteristic features is determined within the authenticating image or video data. Based on the face recognition, the liveliness check and the identification degree it is determined whether an authentication of the occupant is to be accepted.

24 Claims, 5 Drawing Sheets

(51) Int. Cl.
*G06F 21/32* (2013.01)
*G06V 10/60* (2022.01)
*G06V 20/59* (2022.01)
*G06V 40/10* (2022.01)
*G06V 40/16* (2022.01)
*G06V 40/40* (2022.01)

(52) U.S. Cl.
CPC ............ *G06V 20/59* (2022.01); *G06V 40/103* (2022.01); *G06V 40/172* (2022.01); *G06V 40/45* (2022.01)

(58) Field of Classification Search
CPC ...... G06V 40/172; G06V 40/45; G06V 40/40; B60R 25/25; G06N 3/045
See application file for complete search history.

(56) References Cited

U.S. PATENT DOCUMENTS

| 10,198,645 | B2 | 2/2019 | Graumann et al. | |
| 11,479,147 | B2* | 10/2022 | Jales Costa | G06V 40/172 |
| 2016/0210504 | A1* | 7/2016 | Kim | G06F 3/017 |
| 2018/0088887 | A1* | 3/2018 | LeBlanc | G06F 3/1431 |
| 2018/0357500 | A1 | 12/2018 | Lin | |
| 2019/0095737 | A1* | 3/2019 | Hecker | G06V 40/172 |
| 2019/0281187 | A1* | 9/2019 | Sakashita | G06V 40/28 |
| 2019/0370577 | A1* | 12/2019 | Meng | G06V 40/50 |
| 2021/0347328 | A1* | 11/2021 | Bhattacharya | G05B 13/027 |

OTHER PUBLICATIONS

Chakraborty, et al., "An Overview of Face Liveness Detection", Apr. 2004, 15 pages.

Derman, "Continuous Real-Time Vehicle Driver Authentication Using Convolutional Neural Network Based Face Recognition", May 15, 2018, 8 pages.

Shiranthika, "Face Spoof Detection", Retrieved at: https://medium.datadriveninvestor.com/face-spoof-detection-e0d08fb246ea, Feb. 4, 2019, 8 pages.

Wang, et al., "Design and Implementation of Vehicle Unlocking System Based on Face Recognition", Jun. 6, 2019, pp. 121-126.

* cited by examiner

METHOD AND SYSTEM FOR AUTHENTICATING AN OCCUPANT WITHIN AN INTERIOR OF A VEHICLE

CROSS-REFERENCE TO RELATED MATTER

This application claims priority to European Patent Application Number 20193897.4, filed Sep. 1, 2020, the disclosure of which is hereby incorporated by reference in its entirety herein.

BACKGROUND

The present disclosure relates to a method and a system for authenticating an occupant within an interior of a vehicle.

Automobile manufacturers, fleet operators and mobility service providers have currently a considerable interest in methods for authenticating occupants within the interior of a vehicle, for example, in order to provide the occupant with access to certain services and to authorize certain actions for the occupant. Such services and actions may comprise financial transactions and access to personal or sensitive data.

Vision-based face authentication is one of the key technologies which may provide a convenient authentication for an occupant of a vehicle. The vision-based face authentication is based on face recognition technology which has to include, however, protection against attackers trying to achieve unauthorized access. In this context, the term "spoofing" refers to a process of attempting to fool an authentication system into improperly providing access to a system, a service or a function. In case of presence spoofing, a system is caused to believe that a real human is present, regardless of the identification of the person. An example is the presence of a manikin or poster of a person placed e.g. into a vehicle such that it appears like a real person. In case of authentication spoofing, the system does not only recognize that a person is present, but it also falsely identifies the person. As an example, a video of the person to be recognized may be shown to the system, or makeup may be used to alter the true appearance of a person in the view of a camera.

In order to improve face authentication based on facial recognition, an additional liveliness check may be performed to ensure that a face does not stand still during the authentication. In other words, there must be some movement of the face in order to prove that a live person is trying to get authenticated.

However, the additional liveliness check blocks spoofing by static images only. The system may still be attacked, e.g. with video playbacks or three-dimensional masks of a real person.

Accordingly, there is a need to have a method and a system which provide a secure and reliable authentication of an occupant in a vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for authenticating an occupant within an interior of a vehicle, the vehicle including a camera which is configured to monitor the interior of the vehicle and including a processing device which is configured to process image or video data provided by the camera. According to the method, characteristic features being visible via the camera are determined. Via the camera, authenticating image or video data are captured while an occupant is present within the interior of the vehicle. Via the processing device, face recognition and a liveliness check are performed for the occupant based on the authenticating image or video data. An identification degree of the characteristic features within the authenticating image or video data is determined via the processing device. Finally it is determined via the processing device whether an authentication of the occupant is to be accepted based on the face recognition, the liveliness check and the identification degree of the characteristic features.

The characteristic features may be items within the interior of the vehicle which are recognizable by the camera in addition to one or more occupant. Examples for characteristic features are static features or landmarks like edges of windows, A-, B- and/or C-pillars, parts of the ceiling and the center console. The image or video data may be a sequence of single pictures or an entire video being captured during a predefined time period. The identification degree may be defined as a ratio of the number of characteristic features being visible when capturing the authentication image or video data and the total number of characteristic features which may be known after performing the first method step.

The camera may be a RGB camera, i.e. a camera being equipped with a standard CMOS sensor by which visible light is detected in order to acquire colored images of persons and objects. Alternatively, the camera may a near infrared (NIR) camera or a combination of both, i.e. a IR RGB camera. While these types of cameras may usually provide two dimensional (2D) image or video data, it may also be possible to apply a time-of-flight camera, a stereo camera system or a structured-light 3D-camera. These camera systems may provide 3D (three dimensional) information being included in the image or video data. Based on the 3D information, a further authentication check may be included for the occupant.

According to the method, at least a part of the characteristic features has to be identified in the authenticating image or video data before an occupant can pass the authentication, i.e. in addition to face recognition and liveliness check. That is, in addition to static or moving features within the face of an occupant, the characteristic features which are independent of the occupant have to be identified properly within the authenticating image or video data for a successful authentication.

Therefore, it will be very difficult to trick the authentication procedure with a video clip or even a static image which are not captured within the interior of the vehicle from the exact location of the camera. For example, profile pictures taken from social media channels will not be able to pass the authentication.

Even if a video stream from the actual camera being installed in the vehicle may be available, e.g. by capturing a video call from the interior of the vehicle, the video stream will be needed to be played back in front of the camera for the authentication, and the characteristic features, e.g. landmarks within the interior of the vehicle, have exactly to match the expectation which is provided by determining the characteristic features at the beginning of the method. Hence, the authentication is additionally protected against such a spoofing attack based on a video stream by requesting a certain identification degree for the characteristic features being independent from the occupants.

The same holds true for so-called "deep fakes" in which an attacker records a video within the interior of the vehicle by the camera installed therein, e.g. by a video call, and additionally replaces his own face by a two-dimensional picture of a target person being known to the authentication. Such a "deep fake" could be performed by using artificial neural networks and motion transfer techniques. Even in this case it will be very difficult to properly replay such a video using e.g. a flatscreen in such a manner that all characteristic features will match the expectation as explained above.

One remaining possibility to spoof the authentication could be, nevertheless, a display being held in front of the face of the occupant and showing a true sized portrait of a person being known to the face recognition, i.e. while the attacking occupant is sitting in the cabin. The check regarding the characteristic features could be passed in this case. However, object detection methods may be added or a neural network may be trained to distinguish a real occupant from an occupant holding a screen or other device in front of the face displaying another face of a known person.

In addition, hands and arms of the occupant may be detected and tracked in the image or video data, and additional constraints for the authentication may be implemented based on this information. For example, no hand should be in the proximity of the face of the occupant during authentication to make it more difficult to hold a screen in the proper position. The case of the occupant holding a picture or screen in front of the face could be easily detected and rejected by this means. Furthermore, this kind of additional check may be extended to a second occupant, e.g. in the rear seat, holding a picture or screen in front of the face of the occupant to be authenticated.

One further way to still spoof the authentication would be to use a pre-recorded video from the target camera or a deep-fake version of such video, and to directly connect it with the processing unit, i.e. interrupting the camera connection and emulating the camera with the video playback instead of showing the video on a display and having it recorded by the actual camera. Additional mechanisms, e.g. based on cybersecurity or encryption methods, may be implemented to detect and block such kinds of attacks. Furthermore, additional authentication steps may be introduced, for which examples will be outlined below.

In order to perform the method, the camera and the processing device are required only, wherein the camera is usually available in current vehicles anyway and the processing device has to be adapted for the method only, e.g. by a suitable software being able to control the method steps. Therefore, the method according to the disclosure may be easy to implement at low cost using traditional computer vision devices and methods and e.g. machine learning approaches.

The method may comprise one or more of the following features:

Determining the characteristic features may comprise capturing, via the camera, background image or video data without any occupant being present within the interior of the vehicle, and selecting the characteristic features from the background image or video data. The characteristic features may be manually selected from the background image or video data during a calibration phase without any occupant being present within the interior of the vehicle. Alternately, the characteristic features may be automatically selected from the background image or video data by comparing the background image or video data and further image or video data being captured outside the interior of the vehicle.

Determining the identification degree of the characteristic features within the authenticating image or video data may comprise, for each of the characteristic features, determining whether the respective characteristic feature is visible within the authentication image or video data, determining a number of visible characteristic features for the authentication image or video data, and accepting the authentication of the occupant only if the number of visible characteristic features exceeds a predefined threshold.

Alternately, determining the characteristic features may comprise capturing, via the camera, background image or video data without any occupant being present within the interior of the vehicle, capturing, via the camera, further image or video data outside the interior of the vehicle, and training an image classifier regarding the characteristic features based on the background image or video data and further image or video data. The identification degree of the characteristic features may be determined by employing the trained image classifier on the authenticating image or video data.

Each of the characteristic features may be related to an expected image section and an expected position of the expected image section. A plurality of positions for body key points of the occupant may be detected within the authenticating image or video data, and distances between the positions for the body key points of the occupant may be compared with predefined distance ranges. The authentication of the occupant may be accepted only if at least a predetermined number of the distances falls into the predefined distance ranges. During capturing the authenticating image or video data, the illumination intensity may be changed within the interior of the vehicle, and the authentication of the occupant may be accepted only if a detection intensity within the authenticating image or video data changes in accordance with the change of the illumination intensity.

At least one authenticating region may be defined in which the face of the occupant is to be located for authentication within the interior of the vehicle. Based on the authenticating image or video data, it may be determined whether the face of the occupant is located within the authenticating region, and the authentication of the occupant may be accepted only if the face of the occupant is determined to be within the authenticating region. Determining whether an authentication of the occupant is to be accepted may be additionally based on a further authentication request. The further authentication request may comprise defining a task which is to be performed by the occupant and which is suitable to be monitored by the camera, capturing, via the camera, task image or video data while the occupant is expected to perform the task, and determining, via the processing device, whether an authentication of the occupant is to be accepted based on the task image or video data.

According to an embodiment, determining the characteristic features may comprise capturing, via the camera, background image or video data without any occupant being present within the interior of the vehicle, and selecting the characteristic features from the background image or video data. Due to the selection from the background image or video data, the characteristic features may be related to the static features being visible within the interior of the vehicle. By a sophisticated selection of these static features, the protection of the authentication against attackers may be improved.

The characteristic features may be manually selected from the background image or video data during a calibration phase without any occupant being present within the interior of the vehicle. Such a calibration phase may be part of the manufacturing process or of a maintenance service of the vehicle. A manual selection may ensure that no false characteristic features may be selected. Alternatively, the characteristic features may be automatically selected from the background image or video data by comparing these data and further image or video data being captured outside the interior of the vehicle. That is, two sets of images or video sequences may be provided for the automatic selection, i.e. one set being captured within the interior of the vehicle and one set being captured outside. Such an automatic selection may reduce the effort for initializing and performing the authentication method. However, the characteristic features being selected automatically may be checked manually afterwards by an expert in order to remove false characteristic features which should not be used for the authentication method.

According to a further embodiment, determining the identification degree of the characteristic features within the authentication image or video data may comprise, for each of the characteristic features, determining whether the respective characteristic feature is visible within the authentication image or video data, determining a number of visible characteristic features for the authentication image or video data, and accepting the authentication of the occupant only if the number of visible characteristic features exceeds a predefined threshold. The threshold may be predefined but configurable for the individual vehicle. In addition, the threshold may be defined as a percentage of the total number of characteristic features being determined or selected before capturing the authentication image or video data. Counting the number of visible characteristic features within the authentication image or video data may be a straight forward manner for determining the identification degree. This may improve the performance of the method and reduce the cost for its implementation.

According to another embodiment, determining the characteristic features may comprise capturing, via the camera, background image or video data without any occupant being present within the interior of the vehicle, capturing, via the camera, further image or video data outside the interior of the vehicle, and training an image classifier regarding the characteristic features based on the background image or video data and the further image or video data. Furthermore, the identification degree of the characteristic features may be determined by employing the trained image classifier on the authenticating image or video data. In detail, the classifier may output a confidence or a likelihood score defining how likely it is that a predefined input has been acquired in the target environment, i.e. in the interior of the vehicle, from the authenticating image or video data.

The image classifier to be trained may be a machine learning algorithm, e.g. a convolutional neural network, which may be trained for distinguishing the authentication image or video data from the background image or video data and for recognizing the characteristic features. By employing the trained image classifier for determining the identification degree, the method may be performed with almost no human interaction, i.e. as an end-to-end method including the training of the image classifier for generating an additional barrier for the authentication of the occupant via determining the identification degree.

Each of the characteristic features may be related to an expected image section and an expected position of the expected image section. The expected position may be defined as coordinate with respect to the camera which may provide an origin for a coordinate system within the interior of the vehicle. Therefore, in addition to the expected image section defining a "shape" of the respective characteristic feature, its expected position may be defined and stored e.g. in a database of the processing device of the vehicle. Since the expected position, i.e. calibrated coordinates, will most probably be unknown to an attacker providing image or video data to the camera, the protection of the authentication may be additionally improved.

According to a further embodiment, a plurality of positions for body key points of the occupant may be detected within the authenticating image or video data, and distances between the positions for the body key points of the occupant may be compared with predefined distance ranges. That is, it may be determined whether the detected positions are within the predefined distance ranges or not. The authentication of the occupant may be accepted only if at least a predetermined number of the distances falls into the predefined distances ranges. Furthermore, more than one occupant may be examined regarding the positions for the body key points. Such a check of body key points of the occupant may be an additional or redundant condition for the authentication of the occupant to be accepted, i.e. in addition to the identification degree of the characteristic features. Hence, the protection against attackers may be improved by additionally checking the body key points. On the other hand, the check of the body key points of the occupant may be a substitute for checking the characteristic features in case that the check of the characteristic features may fail.

According to a further embodiment, the illumination intensity within the interior of the vehicle may be changed during capturing the authentication image or video data. For example, light sources within the vehicle may be switched on and off for changing the illumination intensity. The authentication of the occupant may be accepted only if a detection intensity within the authentication image or video data changes in accordance with the change of the illumination intensity. For example, there may be an expected change in brightness and/or contrast within the authenticating image or video data which may be determined when monitoring e.g. the characteristic features. Such a change or modulation of the illumination intensity may be used as a further check whether the camera is really observing the interior of the vehicle or some fake video used for spoofing. Furthermore, an infrared source may be used for illumination over a short time period, and a corresponding response may be detected within the authentication image or video data, i.e. regarding the infrared wavelength which may be used for additional illumination.

According to another embodiment, at least one authentication region may be defined in which the face of the occupant is to be located for authentication within the interior of the vehicle. Based on the authenticating image or video data, it may be determined whether the face of the occupant is located within the authenticating region. The authentication of the occupant may be accepted only if the face of the occupant is determined to be within the authenticating region. However, the face of the occupant may be outside the authenticating region for a short predefined time period, and the authentication of the occupant may nevertheless accepted. Such a check regarding the at least one authenticating region may be a further barrier for a spoofing attack regarding the authentication.

Determining whether the authentication of the occupant is to be accepted may be additionally based on a further authentication request. For example, such a further authentication request may be selected from a group comprising voice recognition, fingerprint recognition, mobile device recognition, key fob recognition, personalized key recognition and secret-based authentication. In addition, the further authentication request may comprise defining a task which is to be performed by the occupant and which is suitable to be monitored by the camera, capturing, via the camera, task image or video data while the occupant is expected to perform the task, and determining, via the processing device, whether the authentication of the occupant is to be accepted based on the task image or video data. Requesting the occupant to perform a certain task is also called challenge-response technique. The task may be randomly selected from a predefined group, e.g. requesting the occupant to smile, to close eyes, to make a certain facial expression or to turn the head left, right, up or down. Such a task request may be a further sophisticated barrier for a spoofing attacker and may therefore further improve the protection of the authentication.

In another aspect, the present disclosure is directed at a system for authenticating an occupant within an interior of a vehicle. The system includes a camera for monitoring the interior of the vehicle by providing image or video data, and a processing device.

The camera is configured to capture authenticating image or video data while an occupant is present within the interior of the vehicle. The processing device is configured to determine characteristic features being visible via the camera, to perform a face recognition and a liveliness check for the occupant based on the authenticating image or video data, to determine an identification degree of the characteristic features within the authenticating image or video data, and to determine whether an authentication of the occupant is to be accepted based on the face recognition, the liveliness check and the identification degree of the characteristic features.

As used herein, the term processing device may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing device may include memory (shared, dedicated, or group) that stores code executed by the processor.

In summary, the system according to the disclosure includes the camera and the processing device for performing the steps as described above for the corresponding method. Therefore, the benefits, the advantages and the disclosure as described above for the method are also valid for the system according to the disclosure.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
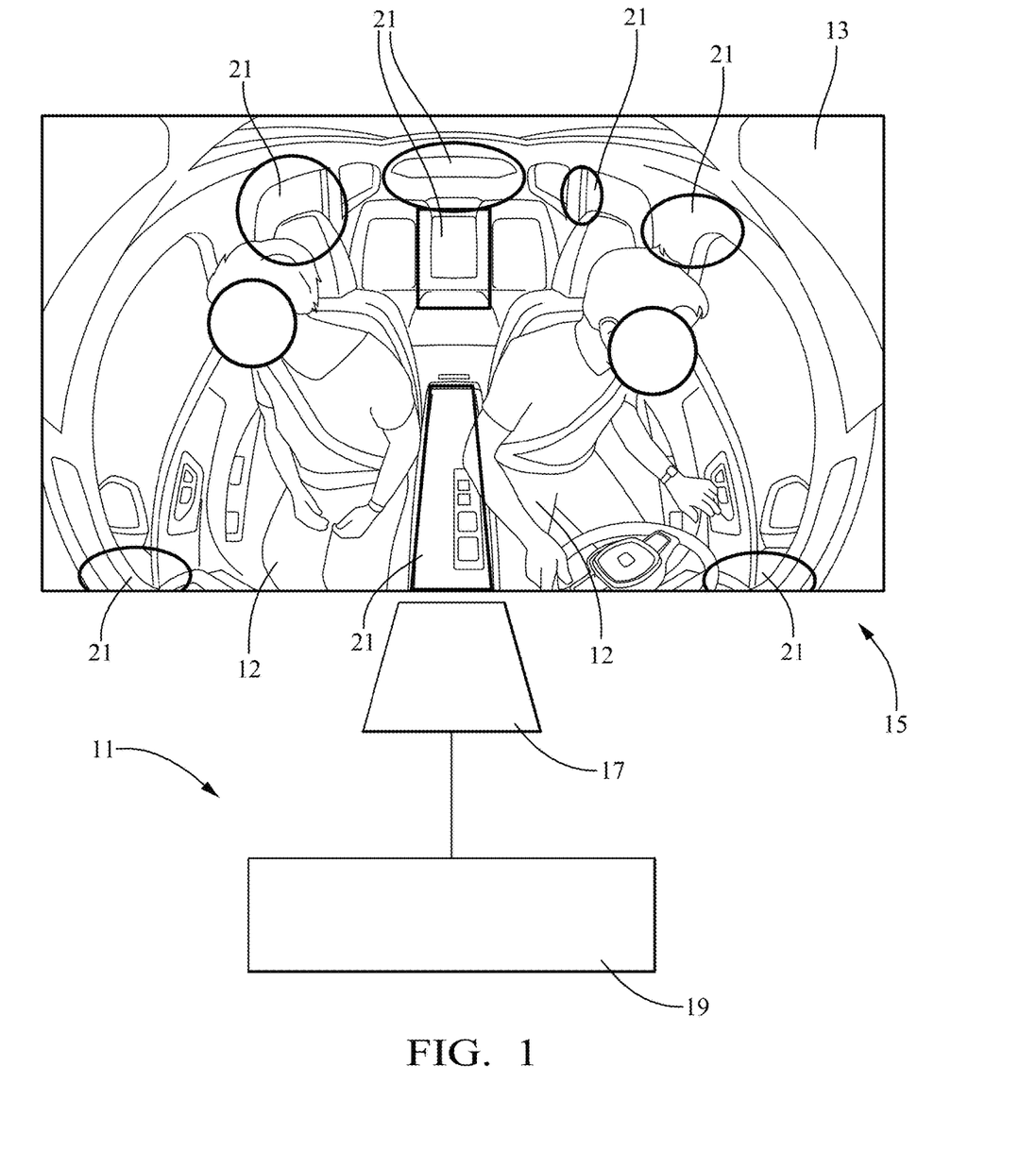
FIG. 1 depicts an interior of a vehicle and a system for authenticating an occupant therein according to the disclosure.

FIG. 1 depicts a system 11 for authenticating an occupant 12 within an interior 13 of a vehicle 15. The system 11 includes a camera 17 for monitoring the interior 13 of the vehicle 15 by providing image or video data 40 (see FIG. 4). The system 11 further includes a processing device 19 which is coupled to the camera 17 in order to process the image and video data 40 (see FIG. 4) being provided by the camera 17.

The camera 17 is a RGB camera, i.e. a camera being equipped with a standard CMOS sensor by which visible light is detected in order to acquire colored images of the occupant 12 and the interior 13 of the vehicle 15. Alternatively, the camera may a near infrared (NIR) camera or a IR RGB camera. While these types of cameras may usually provide two dimensional (2D) image or video data, it may also be possible to apply a time-of-flight camera, a stereo camera system or a structured-light 3D-camera.

FIG. 1 also depicts characteristic features 21 which are highlighted by white contours. The characteristic features 21 are located within an instrumental field of view of the camera 17 and are therefore visible via the camera 17. The characteristic features 21 as shown in FIG. 1 include edges of windows, A-, B- or C-pillars, the center console and a non-movable seat, amongst others. That is, the characteristic features 21 include static items being visible for the camera 17 within the interior 13 of the vehicle 15 for the present embodiment.

Figure 2:
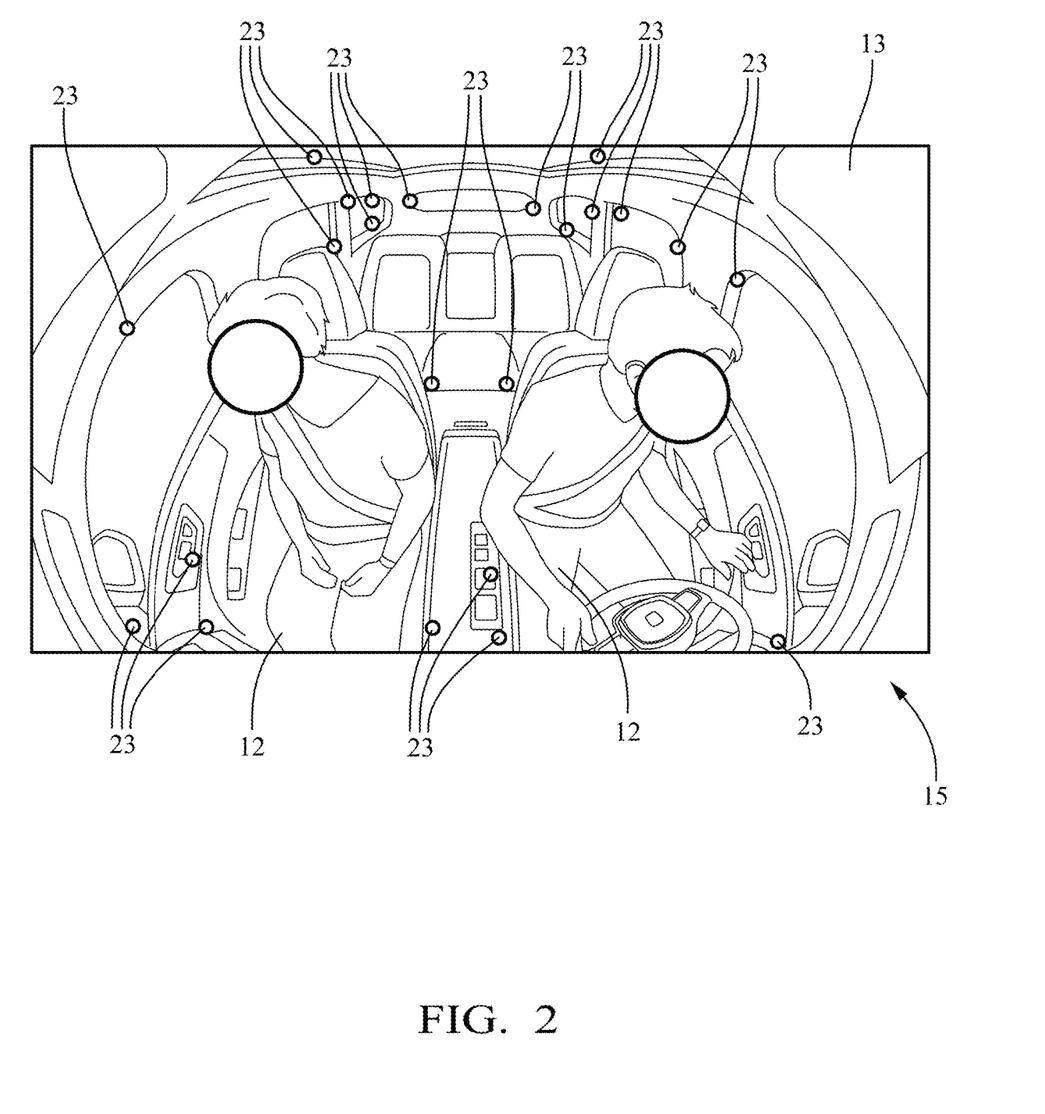
FIG. 2 depicts the interior of the vehicle as shown in FIG. 1 including selected feature points.

As a first alternative, the characteristic features 21 are selected manually by an expert during the manufacturing process or a maintenance service of the vehicle 15 by capturing images of the interior 13 of the vehicle 15 without any occupant being present within the interior 13 and by defining vectors with respect to the camera 17 being used as an origin of a coordinate system, as well as line or corner features or image regions in order to describe the respective characteristic feature 21 geometrically. As a second alternative, a feature detection algorithm may be used which automatically detects feature points 23 as shown in FIG. 2 as small white circles within the interior 13 of the vehicle 15. The feature points 23 belong to corners, edges of large homogenous regions, lines etc. of static items being visible in the interior 13. The characteristic features 21 are therefore described by the feature detection algorithm based on the feature points 23 and using a descriptor, i.e. a numerical or geometrical representation or abstraction of the characteristic feature 21.

In order to detect the feature points 23 automatically, two training sets 41, 43 (see FIG. 4) of sample images are used, wherein a first training set 41 comprises images being captured via the camera 17 within the interior 13 of the vehicle 15, whereas the second training set 43 includes images which are not captured within the interior 13 of the vehicle 15. The feature detection algorithm searches for items that occur frequently in the first training set 41, but rarely in the second training set 43 in order to define the feature points 23.

The characteristic features 21 being detected automatically based on feature points 23 may optionally be visualized on a screen in addition to the captured images of the interior 13 of the vehicle 15 in order to be verified by a human expert. The characteristic features 21 being either manually selected or automatically detected are stored in a feature database 53 (see FIG. 4) and shipped together with a suitable vehicle software.

Figure 3:
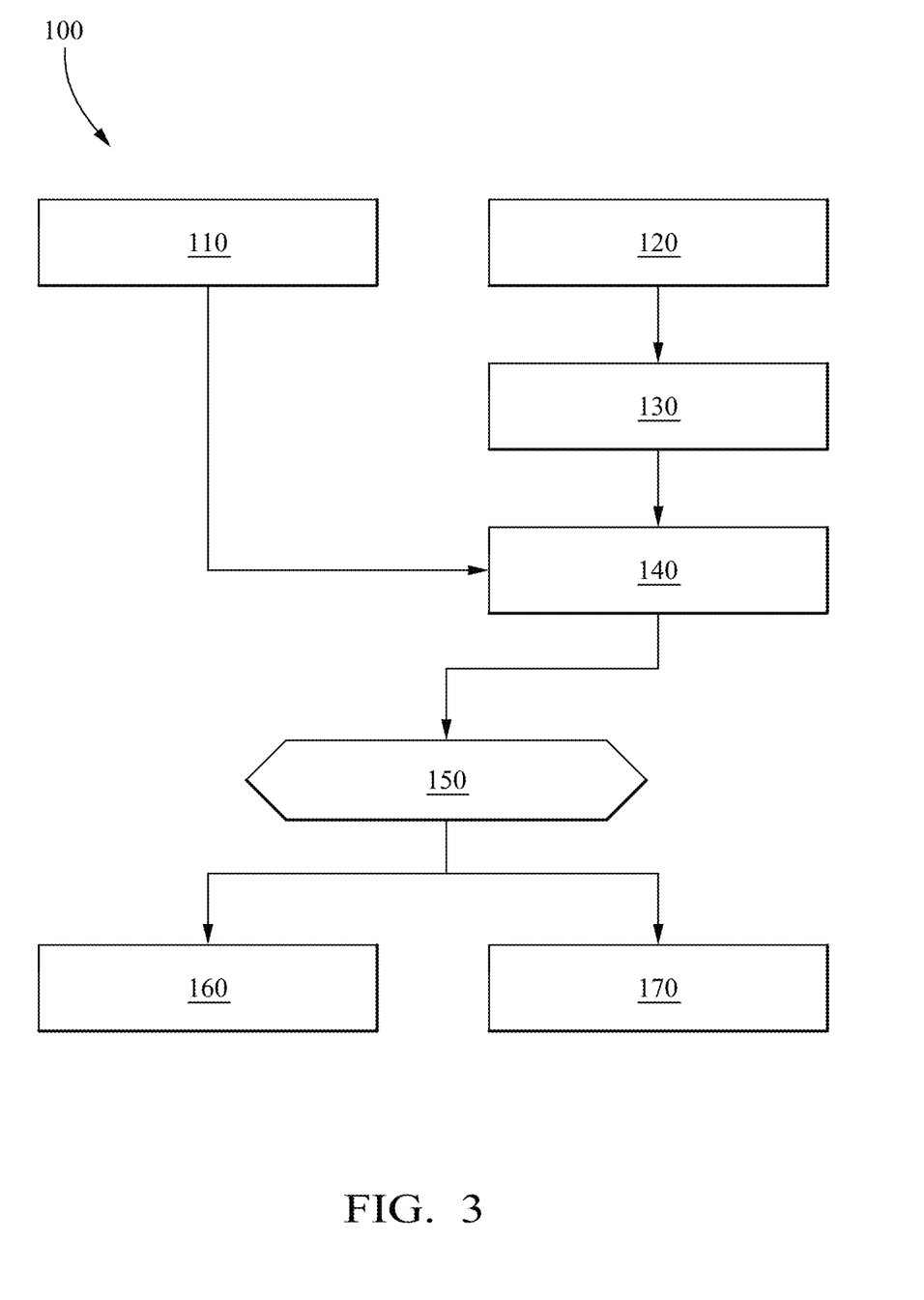
FIG. 3 depicts a block diagram of a method according to the disclosure.

FIG. 3 depicts a method 100 for authenticating an occupant 12 within the interior 13 of a vehicle 15 (see also FIG. 1). At step 110, the characteristic features 21 which are visible via the camera 17 are determined as described above in context of FIGS. 1 and 2. Step 110 provides the preparation for the authentication of the occupant 12 before the vehicle 15 will be in use. Step 110 therefore corresponds to the training and calibration phase 31 (see FIG. 4) as will be described in detail below. The further steps 120 to 150 are performed at "runtime" of the vehicle 15 and therefore correspond to the authentication phase 33, as will be detailed in context of FIG. 4 as well.

At step 120, authenticating image or video data 45 (see FIG. 4) are captured via the camera 17 while an occupant 12 is present within the interior of the vehicle. Based on the authenticating image or a video data 45, a face recognition and a liveliness check is performed for the occupant 12 via the processing device 19 of the system 11 (see also FIG. 1) at step 130. For the face recognition, a face region of the occupant 12 is detected e.g. using a machine learning algorithm, e.g. a convolutional neural network, or a computer vision algorithm, and facial embedding or feature vectors are calculated. The facial embedding or feature vectors are then examined for matches with known faces taken from a database. That is, the face of the occupant 12 can be recognized only if images and/or features of the face are known to the system 11 and stored in a corresponding database. For the liveliness check, the authenticating image or video data 45 are checked for some movement or change which is independent from a static background. The movement may comprise head movement, eye rotation, mouth opening and/or change of the facial expression. The detection of such a movement suggests that a live person is trying to get authenticated. The face recognition together with a liveliness check blocks spoofing attacks which are performed by static images. However, a video playback or a three-dimensional mask on a real person may be able to overcome the face recognition and the liveliness check being performed at step 130.

Therefore, at step 140 an identification degree of the characteristic features 21 within the authenticating image or video data 45 is determined via the processing device 19. The identification degree is defined by the number of characteristic features 21 which are visible or recognizable within the authenticating image or video data 45 being captured at "runtime" of the vehicle 15 in relation to the total number of characteristic features 21 as determined at step 110 and stored in the feature database 53. In other words, step 140 searches for matches of the characteristic features 21 as predefined in the feature database 53 within the authenticating image or video data 45, and the number of matches are determined. The number of matches defines the identification degree.

Thereafter, it is determined via the processing device 19 at step 150 whether an authentication of the occupant 12 is to be accepted based on the face recognition, the liveliness check and the identification degree of characteristic features 21. That is, three criteria must be fulfilled in order to authenticate the occupant 12 properly. The occupant 12 must pass the face recognition and the liveliness check as first and second criteria, and in addition, the identification degree of the characteristic features 21 has to be greater than a predefined threshold. In detail, the number of matches of the characteristic features 21 as determined at step 110 which are found in the authenticating image or video data 45 has to exceed a predefined number. This defines a third condition which has to be fulfilled for the authentication of the occupant 12.

If one or more of the three criteria is not fulfilled at 150, the authentication of the occupant 12 is rejected at 160. If all criteria are fulfilled at 150, i.e. is face recognition, liveliness check are passed and the identification degree of the characteristic features 21 is greater than the predefined threshold, the authentication of the occupant 12 is accepted at 170.

Due to the third condition provided by the identification degree of the characteristic features 21, it is almost impossible to spoof the system 11 and the method 100 with a videoclip or static image which is not captured from the exact position of the camera 17 within the interior 13 of the vehicle 15 (see FIG. 1). Profile pictures taken e.g. from social media channels will not be able to pass the authentication. Even if a video stream from the camera 17 within the vehicle 15 is available, e.g. by capturing a videocall, such a video stream would have to be played back in front of the camera such that the characteristic features 21 exactly match the expectation, i.e. the exact position and shapes of the characteristic features 21 as predefined in the feature database 53 (see FIG. 4). Such a playback will be extremely difficult using e.g. a flatscreen.

Figure 4:
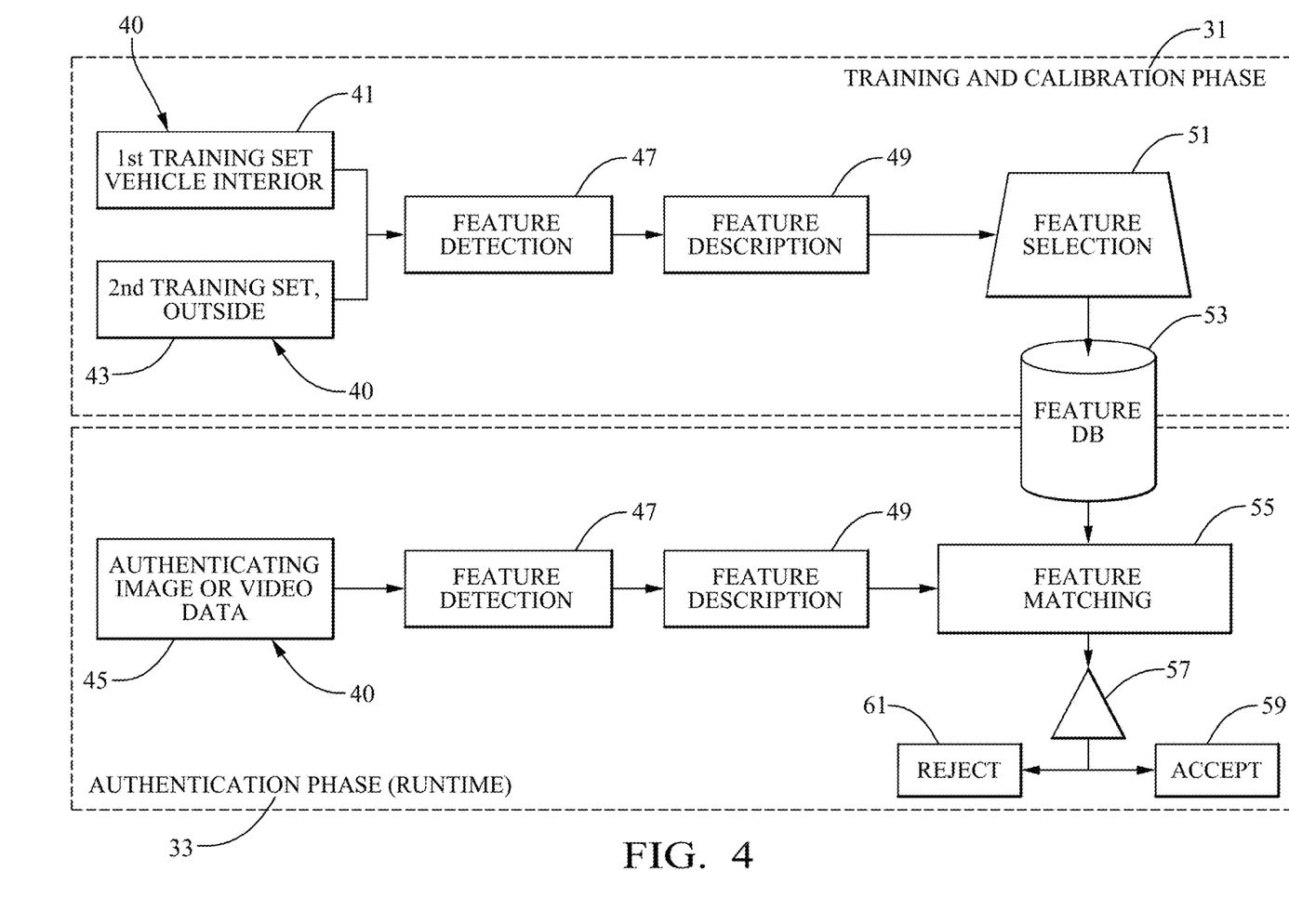
FIG. 4 depicts a diagram for details of the system and the method according to the disclosure.

FIG. 4 depicts details for using the system 11 and for performing the method 100 as described above in context of FIGS. 1 to 3. The system 11 and the method 100 are based on a training and calibration phase 31 in which the method step 110 is performed in order to determine the characteristic features 21 which are visible via the camera 17 (see also FIG. 1). The actual authentication of an occupant 12 within the interior 13 of the vehicle 15 is performed during an authentication phase 33 in which the characteristic features 21 are used which are stored in the feature database 53 at the end of the training and calibration phase 31. Both phases 31, 33 rely on image or video data 40 which are provided by the camera 17.

At the beginning of the training and calibration phase 31, a first training set 41 of sample image or video data and a second training set 43 of image or video data are captured. The first training set is captured within the interior 13 of the vehicle 15, whereas the second training set 43 is captured within different environments, i.e. other than the interior 13 of the vehicle 15. Based on the first and the second training sets 41, 43, a feature detection 47 is performed in which a feature detection algorithm searches for items that occur frequently in the first training set 41, but rarely in the second training set 43. For the detected features, a feature description 49 is performed which includes a geometrical or numerical representation of the respective feature and coordinates of at least one characteristic feature point 23 with respect to the camera 17. In addition, the detected features are labelled regarding their origin from the interior 13 of the vehicle 15 or from the outside of the vehicle 15.

For the detected features, a feature selection 51 is performed in which the detected features are selected either manually or automatically as described above in context of FIG. 1 and FIG. 2, respectively. After the feature selection 51, expected characteristic features 21 are stored in the feature database 53.

During the authentication phase 33, authentication image or video data 45 are captured while an occupant 12 is present within the interior 13 of the vehicle 15 (see also FIG. 1). Based on the authenticating image or video data 45, a feature detection 47 is performed in the same manner as described above for the training sets 41, 43. That is, the authenticating image or video data 45 may be compared with the second training set 43 being captured outside the interior 13 of the vehicle 15. Thereafter, a feature description 49 is also provided for the features being detected based on the authenticating image or video data 45. After the feature description 49, detected characteristic features are available for a feature matching procedure 55. The feature matching procedure 55 also receives the expected characteristic features 21 which are stored in the feature database 53. The feature matching procedure 55 compares the detected features and the expected characteristic features 21 regarding similarity, e.g. regarding the geometrical shape, and regarding proximity, i.e. regarding their position with respect to the camera 17. If the similarity and the proximity of the detected features and the expected characteristic features 21 are both within a predetermined threshold, a respective detected feature is regarded as a match of an expected characteristic feature 21.

For all detected features which are based on the authenticating image or video data 45, the total number of matches is determined via the feature matching procedure 55. At 57, this number of matches is compared with a number of requested matches or a threshold for the number of matches. If the number of matches being determined for the detected features is greater than the number of required matches, the authentication of the occupant 12 is accepted at 59, provided that the face recognition and the liveliness check for the occupant are successful which are additionally performed based on the authentication image or video data 45 (see step 130 in FIG. 3). If the number of matches for the detected features is equal to or smaller than the number of required matches at 57, the authentication of the occupant 12 is rejected regardless of the face recognition and the liveliness check.

The feature detection 47, the feature description 49, the feature selection 51 and the feature matching procedure 55 are performed via the processing device 19 (see FIG. 1). The feature database 53 may also be part of the processing device 19. As an alternative to the feature selection 51, an image classifier may be trained based on the training datasets 41, 43. The image classifier may be a machine learning algorithm, e.g. a convolutional neural network, or another image classification method which may learn based on the training datasets 41, 43 which features have to be regarded as expected characteristic features 21 being visible for the camera 17 within the interior 13 of the vehicle 15. Furthermore, the image classifier may be employed on the authenticating image or video data 45, i.e. the detected features, in order to perform the feature matching. By this means, an end-to-end training regarding the characteristic features 21 may be implemented.

As a further condition for accepting the authentication of the occupant 12 at 59, one or more further authentication requests or authentication tests may be performed. These further authentication requests may comprise voice recognition, fingerprint recognition, and mobile device recognition, amongst others. Furthermore, a task may be defined which has to be performed by the occupant 12 in order to be authenticated. For example, the occupant 12 may be requested to smile, to close eyes or to turn the head in a certain direction.

Figure 5:
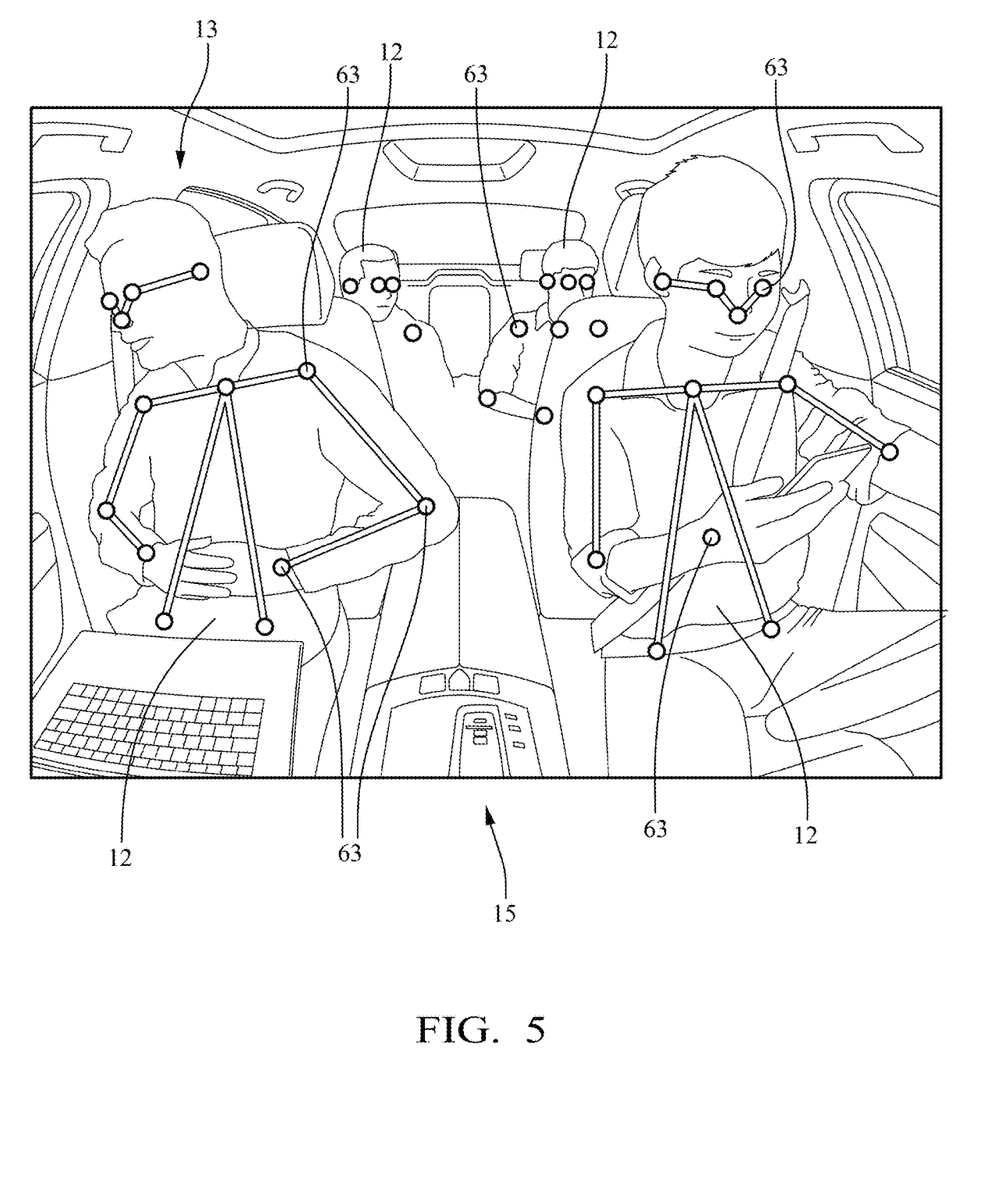
FIG. 5 depicts an interior of a vehicle including body key points of occupants.

As a further check for the authentication of the occupant 12 within the interior 13 of the vehicle 15, a plurality of positions for body key points 63 of at least one occupant 12 may be detected based on the authenticating image or video data 45. Detected positions for body key points 63 are depicted in FIG. 5 for the interior 13 of the vehicle 15. The positions of the body key points 63 comprise the eye positions, the nose position, the ankle position and the position of the occupant's 12 further joints. For the recognition of the body key points 63, a similar detection algorithm may be used as the feature detection algorithm being described above for automatically detecting feature points 23. The detected position for the body key points 63 may also be compared with expected positions, i.e. either with respect to the camera 17 or with respect to each other, e.g. regarding their distances. For example, if the detected eye positions are not within a predefined range for their absolute position with respect to the camera 17 or within a range regarding their distance, the authentication of the respective occupant 12 is rejected.

As a further check, the illumination within the interior 13 of the vehicle 15 may be changed or modulated, and it may be detected whether the authenticating image or video data 45, i.e. their intensity, changes or modulates in the same manner as the change or modulation of the illumination. For example, if brightness and contrast of the authenticating image or video data 45 do not change, an attacker probably tries to spoof the authentication system 11 e.g. by an image or a video of an occupant 12 who is not really present within the interior 13 of the vehicle 15. In this case, the authentication is rejected.

What is claimed is:

1. A method, comprising:
   generating, with a camera, image or video data of an interior of a vehicle;
   determining characteristic features that are visible via the camera; and
   authenticating an occupant in the interior of the vehicle by:
   capturing, from the image or video data generated by the camera, an authenticating image or video data that indicates a presence of the occupant within the interior of the vehicle;

performing, by a processor, based on the authenticating image or video data, a face recognition and a liveliness check for the occupant;
determining, within the authenticating image or video data, an identification degree of the characteristic features; and
determining whether to authenticate the occupant based on the face recognition, the liveliness check, and the identification degree of the characteristic features;
during capturing the authenticating image or video data, changing an illumination intensity within the interior of the vehicle; and
authenticating the occupant only if a detection intensity within the authenticating image or video data changes in accordance with the change of the illumination intensity.

2. The method of claim 1, wherein determining the characteristic features comprises:
capturing, via the camera, background image or video data without any occupants present within the interior of the vehicle; and
selecting, from the background image or video data, the characteristic features.

3. The method of claim 2, wherein the characteristic features are manually selected from the background image or video data during a calibration phase without any occupants present within the interior of the vehicle.

4. The method of claim 2, wherein the characteristic features are automatically selected from the background image or video data by comparing the background image or video data with further image or video data captured from outside the interior of the vehicle.

5. The method of claim 1, wherein determining the identification degree of the characteristic features within the authenticating image or video data further comprises:
for each of the characteristic features, determining whether the respective characteristic feature is visible within the authentication image or video data;
determining a number of visible characteristic features for the authentication image or video data; and
authenticating the occupant only if the number of visible characteristic features exceeds a predefined threshold.

6. The method of claim 1, further comprising:
capturing, via the camera, background image or video data without any occupants present within the interior of the vehicle;
capturing, via the camera, further image or video data from outside the interior of the vehicle; and
training an image classifier regarding the characteristic features based on the background image or video data and the further image or video data, and
wherein determining the identification degree of the characteristic features by employing the trained image classifier on the authenticating image or video data.

7. The method of claim 1, wherein each of the characteristic features is related to an expected image section and to an expected position of the expected image section.

8. The method of claim 1, further comprising:
detecting a plurality of positions for body key points of the occupant within the authenticating image or video data;
comparing distances between the positions for the body key points of the occupant with predefined distance ranges; and
authenticating the occupant only if at least a predetermined number of the distances falls into the predefined distance ranges.

9. The method of claim 1, further comprising:
defining at least one authenticating region in which the face of the occupant is to be located for authentication within the interior of the vehicle;
determining, based on the authenticating image or video data, whether the face of the occupant is located within the authenticating region; and
authenticating the occupant only if the face of the occupant is determined to be within the authenticating region.

10. The method of claim 1, wherein determining whether to authenticate the occupant is additionally based on a further authentication request.

11. The method of claim 10, further comprising:
performing the further authentication request by:
defining a task that is to be performed by the occupant and that is suitable to be monitored by the camera;
capturing, via the camera, task image or video data while the occupant is expected to perform the task; and
determining, via the processor, whether to authenticate the occupant based on the task image or video data.

12. A system, comprising:
a camera configured to monitor an interior of a vehicle by generating image or video data including by capturing authenticating image or video data while an occupant is present within the interior of the vehicle; and
a processor configured to:
determine characteristic features visible from the image or video data generated by the camera;
perform a face recognition and a liveliness check for the occupant based on the authenticating image or video data;
determine an identification degree of the characteristic features within the authenticating image or video data;
determine whether an authentication of the occupant is to be accepted based on the face recognition, the liveliness check and the identification degree of the characteristic features;
during capturing the authenticating image or video data, change an illumination intensity within the interior of the vehicle; and
authenticate the occupant only if a detection intensity within the authenticating image or video data changes in accordance with the change of the illumination intensity.

13. The system of claim 12, wherein the processor is further configured to:
capture, via the camera, background image or video data without any occupants present within the interior of the vehicle;
capture, via the camera, further image or video data from outside the interior of the vehicle; and
train an image classifier regarding the characteristic features based on the background image or video data and the further image or video data, and
determine the identification degree of the characteristic features by employing the trained image classifier on the authenticating image or video data.

14. A non-transitory computer readable medium comprising instructions that, when executed, cause hardware circuitry to:
generate, with a camera, image or video data of an interior of a vehicle;
determine characteristic features that are visible via the camera; and authenticate an occupant in the interior of the vehicle by:
    capturing, from the image or video data generated by the camera, an authenticating image or video data that indicates a presence of the occupant within the interior of the vehicle;
    performing based on the authenticating image or video data, a face recognition and a liveliness check for the occupant;
    determining, within the authenticating image or video data, an identification degree of the characteristic features;
    determining whether to authenticate the occupant based on the face recognition, the liveliness check, and the identification degree of the characteristic features;
    during capturing the authenticating image or video data, changing an illumination intensity within the interior of the vehicle; and
    authenticating the occupant only if a detection intensity within the authenticating image or video data changes in accordance with the change of the illumination intensity.

15. The non-transitory computer readable medium of claim 14, wherein the instructions, when executed, cause the hardware circuitry to determine the characteristic features by:
    capturing, via the camera, background image or video data without any occupants present within the interior of the vehicle; and
    selecting, from the background image or video data, the characteristic features.

16. The non-transitory computer readable medium of claim 15, wherein the characteristic features are manually selected from the background image or video data during a calibration phase without any occupants present within the interior of the vehicle.

17. The non-transitory computer readable medium of claim 15, wherein the characteristic features are automatically selected from the background image or video data by comparing the background image or video data with further image or video data captured from outside the interior of the vehicle.

18. The non-transitory computer readable medium of claim 14, wherein the instructions, when executed, cause the hardware circuitry to determine the identification degree of the characteristic features within the authenticating image or video data by:
    for each of the characteristic features, determining whether the respective characteristic feature is visible within the authentication image or video data;
    determining a number of visible characteristic features for the authentication image or video data; and
    authenticating the occupant only if the number of visible characteristic features exceeds a predefined threshold.

19. The non-transitory computer readable medium of claim 14, wherein the instructions, when executed, further cause the hardware circuitry to:
    capture, via the camera, background image or video data without any occupants present within the interior of the vehicle;
    capture, via the camera, further image or video data from outside the interior of the vehicle; and
    train an image classifier regarding the characteristic features based on the background image or video data and the further image or video data, and
    determine the identification degree of the characteristic features by employing the trained image classifier on the authenticating image or video data.

20. A method, comprising:
    generating, with a camera, image or video data of an interior of a vehicle;
    determining characteristic features that are visible via the camera; and
    authenticating an occupant in the interior of the vehicle by:
        capturing, from the image or video data generated by the camera, an authenticating image or video data that indicates a presence of the occupant within the interior of the vehicle;
        performing, by a processor, based on the authenticating image or video data, a face recognition and a liveliness check for the occupant;
        determining, within the authenticating image or video data, an identification degree of the characteristic features; and
        determining whether to authenticate the occupant based on the face recognition, the liveliness check, and the identification degree of the characteristic features,
    wherein determining the characteristic features comprises:
        capturing, via the camera, background image or video data without any occupants present within the interior of the vehicle; and
        selecting, from the background image or video data, the characteristic features, and
    wherein the characteristic features are automatically selected from the background image or video data by comparing the background image or video data with further image or video data captured from outside the interior of the vehicle.

21. A method, comprising:
    generating, with a camera, image or video data of an interior of a vehicle;
    determining characteristic features that are visible via the camera; and
    authenticating an occupant in the interior of the vehicle by:
        capturing, from the image or video data generated by the camera, an authenticating image or video data that indicates a presence of the occupant within the interior of the vehicle;
        performing, by a processor, based on the authenticating image or video data, a face recognition and a liveliness check for the occupant;
        determining, within the authenticating image or video data, an identification degree of the characteristic features; and
        determining whether to authenticate the occupant based on the face recognition, the liveliness check, and the identification degree of the characteristic features
        capturing, via the camera, background image or video data without any occupants present within the interior of the vehicle;
    capturing, via the camera, further image or video data from outside the interior of the vehicle; and
    training an image classifier regarding the characteristic features based on the background image or video data and the further image or video data, and
    wherein determining the identification degree of the characteristic features by employing the trained image classifier on the authenticating image or video data.

22. A system, comprising:
    a camera configured to monitor an interior of a vehicle by generating image or video data including by capturing authenticating image or video data while an occupant is present within the interior of the vehicle; and a processor configured to:
determine characteristic features visible from the image or video data generated by the camera;
perform a face recognition and a liveliness check for the occupant based on the authenticating image or video data;
determine an identification degree of the characteristic features within the authenticating image or video data;
determine whether an authentication of the occupant is to be accepted based on the face recognition, the liveliness check and the identification degree of the characteristic features;

wherein the processor is further configured to:
capture, via the camera, background image or video data without any occupants present within the interior of the vehicle;
capture, via the camera, further image or video data from outside the interior of the vehicle; and
train an image classifier regarding the characteristic features based on the background image or video data and the further image or video data, and
determine the identification degree of the characteristic features by employing the trained image classifier on the authenticating image or video data.

23. A non-transitory computer readable medium comprising instructions that, when executed, cause hardware circuitry to:
generate, with a camera, image or video data of an interior of a vehicle;
determine characteristic features that are visible via the camera; and
authenticate an occupant in the interior of the vehicle by:
capturing, from the image or video data generated by the camera, an authenticating image or video data that indicates a presence of the occupant within the interior of the vehicle;
performing based on the authenticating image or video data, a face recognition and a liveliness check for the occupant;
determining, within the authenticating image or video data, an identification degree of the characteristic features;
determining whether to authenticate the occupant based on the face recognition, the liveliness check, and the identification degree of the characteristic features, wherein the instructions, when executed, cause the hardware circuitry to determine the characteristic features by:
capturing, via the camera, background image or video data without any occupants present within the interior of the vehicle; and
selecting, from the background image or video data, the characteristic features, and wherein the characteristic features are automatically selected from the background image or video data by comparing the background image or video data with further image or video data captured from outside the interior of the vehicle.

24. A non-transitory computer readable medium comprising instructions that, when executed, cause hardware circuitry to:
generate, with a camera, image or video data of an interior of a vehicle;
determine characteristic features that are visible via the camera; and
authenticate an occupant in the interior of the vehicle by:
capturing, from the image or video data generated by the camera, an authenticating image or video data that indicates a presence of the occupant within the interior of the vehicle;
performing based on the authenticating image or video data, a face recognition and a liveliness check for the occupant;
determining, within the authenticating image or video data, an identification degree of the characteristic features;
determining whether to authenticate the occupant based on the face recognition, the liveliness check, and the identification degree of the characteristic features, wherein the instructions, when executed, further cause the hardware circuitry to:
capture, via the camera, background image or video data without any occupants present within the interior of the vehicle;
capture, via the camera, further image or video data from outside the interior of the vehicle; and
train an image classifier regarding the characteristic features based on the background image or video data and the further image or video data, and
determine the identification degree of the characteristic features by employing the trained image classifier on the authenticating image or video data.

* * * * *

UNITED STATES PATENT AND TRADEMARK OFFICE
CERTIFICATE OF CORRECTION

PATENT NO. : 12,001,533 B2  
APPLICATION NO. : 17/392083  
DATED : June 4, 2024  
INVENTOR(S) : Alexander Barth et al.

Page 1 of 1

It is certified that error appears in the above-identified patent and that said Letters Patent is hereby corrected as shown below:

In the Claims

Column 13, Claim 1, Line 6: after "features;", delete "and"

Signed and Sealed this  
Eighth Day of April, 2025

Coke Morgan Stewart  
*Acting Director of the United States Patent and Trademark Office*